(12) United States Patent
Suciu et al.

(10) Patent No.: US 7,980,054 B2
(45) Date of Patent: Jul. 19, 2011

(54) EJECTOR COOLING OF OUTER CASE FOR TIP TURBINE ENGINE

(75) Inventors: Gabriel L. Suciu, Glastonbury, CT (US); Gary D. Roberge, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 747 days.

(21) Appl. No.: 11/720,083

(22) PCT Filed: Dec. 1, 2004

(86) PCT No.: PCT/US2004/040097
§ 371 (c)(1),
(2), (4) Date: May 24, 2007

(87) PCT Pub. No.: WO2006/110124
PCT Pub. Date: Oct. 19, 2006

(65) Prior Publication Data
US 2008/0014078 A1 Jan. 17, 2008

(51) Int. Cl.
*F02K 3/02* (2006.01)
(52) U.S. Cl. .................. 60/39.43; 60/226.1
(58) Field of Classification Search .......... 60/39.43, 60/804, 726, 805, 226.1, 224, 225, 761
See application file for complete search history.

(56) References Cited

U.S. PATENT DOCUMENTS

| | | |
|---|---|---|
| 1,544,318 A | 6/1925 | Hodgkinson |
| 2,221,685 A | 11/1940 | Smith |
| 2,414,410 A | 1/1947 | Griffith |
| 2,499,831 A | 3/1950 | Palmatier |
| 2,548,975 A | 4/1951 | Hawthorne |
| 2,611,241 A | 9/1952 | Schulz |
| 2,620,554 A | 12/1952 | Mochel et al. |
| 2,698,711 A | 1/1955 | Newcomb |
| 2,801,789 A | 8/1957 | Moss |
| 2,830,754 A | 4/1958 | Stalker |
| 2,874,926 A | 2/1959 | Gaubatz |
| 2,989,848 A | 6/1961 | Paiement |
| 3,009,630 A | 11/1961 | Busquet |
| 3,037,742 A | 6/1962 | Dent et al. |
| 3,042,349 A | 7/1962 | Pirtle et al. |
| 3,081,597 A | 3/1963 | Kosin et al. |
| 3,132,842 A | 5/1964 | Tharp |

(Continued)

FOREIGN PATENT DOCUMENTS

DE 767704 5/1953

(Continued)

*Primary Examiner* — Michael Cuff
*Assistant Examiner* — Vikansha S Dwivedi
(74) *Attorney, Agent, or Firm* — Carlson, Gaskey & Olds, PC

(57) ABSTRACT

A tip turbine engine (10) includes a combustor (30) radially outward of a fan. In order to reduce the heat transfer from the combustor and the high-energy gas stream generated by the combustor, a cold air ejector (38) radially outward of the combustor extends from a forward end of the nacelle (12) to a point rearward of the combustor and an exhaust mixer (110). The cold air ejector includes an annular inlet (17) at the forward end of the nacelle. The cold air ejector draws air over the outer engine case (39) to provide a boundary between the nacelle and the hot outer engine case. The layer of air being pulled past the engine case ejects the heat, thereby preventing the heat from escaping into the nacelle or engine bay.

19 Claims, 2 Drawing Sheets

U.S. PATENT DOCUMENTS

| | | | |
|---|---|---|---|
| 3,204,401 A | 9/1965 | Serriades | |
| 3,216,455 A | 11/1965 | Cornell et al. | |
| 3,267,667 A | 8/1966 | Erwin | |
| 3,269,120 A | 8/1966 | Sabatiuk | |
| 3,283,509 A | 11/1966 | Nitsch | |
| 3,286,461 A | 11/1966 | Johnson | |
| 3,302,397 A | 2/1967 | Davidovic | |
| 3,363,419 A | 1/1968 | Wilde | |
| 3,404,831 A | 10/1968 | Campbell | |
| 3,418,808 A * | 12/1968 | Rich | 60/226.1 |
| 3,465,526 A | 9/1969 | Emerick | |
| 3,496,725 A | 2/1970 | Ferri et al. | |
| 3,505,819 A | 4/1970 | Wilde | |
| 3,616,616 A | 11/1971 | Flatt | |
| 3,684,857 A | 8/1972 | Morley et al. | |
| 3,703,081 A | 11/1972 | Krebs et al. | |
| 3,705,775 A | 12/1972 | Rioux | |
| 3,720,060 A | 3/1973 | Davies et al. | |
| 3,729,957 A | 5/1973 | Petrie et al. | |
| 3,735,593 A | 5/1973 | Howell | |
| 3,811,273 A | 5/1974 | Martin | |
| 3,818,695 A * | 6/1974 | Rylewski | 60/39.183 |
| 3,836,279 A | 9/1974 | Lee | |
| 3,861,822 A | 1/1975 | Wanger | |
| 3,932,813 A | 1/1976 | Gallant | |
| 3,979,087 A | 9/1976 | Boris et al. | |
| 4,005,575 A | 2/1977 | Scott et al. | |
| 4,130,379 A | 12/1978 | Partington | |
| 4,147,035 A | 4/1979 | Moore et al. | |
| 4,251,185 A | 2/1981 | Karstensen | |
| 4,251,987 A | 2/1981 | Adamson | |
| 4,265,646 A | 5/1981 | Weinstein et al. | |
| 4,271,674 A | 6/1981 | Marshall et al. | |
| 4,298,090 A | 11/1981 | Chapman | |
| 4,326,682 A | 4/1982 | Nightingale | |
| 4,452,038 A | 6/1984 | Soligny | |
| 4,463,553 A | 8/1984 | Boudigues | |
| 4,561,257 A | 12/1985 | Kwan et al. | |
| 4,563,875 A | 1/1986 | Howald | |
| 4,631,092 A | 12/1986 | Ruckle et al. | |
| 4,751,816 A | 6/1988 | Perry | |
| 4,785,625 A | 11/1988 | Stryker et al. | |
| 4,817,382 A | 4/1989 | Rudolph et al. | |
| 4,834,614 A | 5/1989 | Davids et al. | |
| 4,883,404 A | 11/1989 | Sherman | |
| 4,887,424 A | 12/1989 | Geidel et al. | |
| 4,904,160 A | 2/1990 | Partington | |
| 4,912,927 A | 4/1990 | Billington | |
| 4,965,994 A | 10/1990 | Ciokajlo et al. | |
| 4,999,994 A | 3/1991 | Rud et al. | |
| 5,010,729 A | 4/1991 | Adamson et al. | |
| 5,012,640 A | 5/1991 | Mirville | |
| 5,014,508 A | 5/1991 | Lifka | |
| 5,088,742 A | 2/1992 | Catlow | |
| 5,107,676 A | 4/1992 | Hadaway et al. | |
| 5,157,915 A | 10/1992 | Bart | |
| 5,182,906 A | 2/1993 | Gilchrist et al. | |
| 5,224,339 A | 7/1993 | Hayes | |
| 5,232,333 A | 8/1993 | Girault | |
| 5,267,397 A | 12/1993 | Wilcox | |
| 5,269,139 A | 12/1993 | Klees | |
| 5,275,536 A | 1/1994 | Stephens et al. | |
| 5,315,821 A | 5/1994 | Dunbar et al. | |
| 5,328,324 A | 7/1994 | Dodd | |
| 5,443,590 A | 8/1995 | Ciokajlo et al. | |
| 5,466,198 A | 11/1995 | McKibbin et al. | |
| 5,497,961 A | 3/1996 | Newton | |
| 5,501,575 A | 3/1996 | Eldredge et al. | |
| 5,537,814 A | 7/1996 | Nastuk et al. | |
| 5,584,660 A | 12/1996 | Carter et al. | |
| 5,628,621 A | 5/1997 | Toborg | |
| 5,746,391 A | 5/1998 | Rodgers et al. | |
| 5,769,317 A | 6/1998 | Sokhey et al. | |
| 6,004,095 A | 12/1999 | Waitz et al. | |
| 6,095,750 A | 8/2000 | Ross et al. | |
| 6,102,361 A | 8/2000 | Riikonen | |
| 6,158,207 A | 12/2000 | Polenick et al. | |
| 6,223,616 B1 | 5/2001 | Sheridan | |
| 6,244,539 B1 | 6/2001 | Lifson et al. | |
| 6,364,805 B1 | 4/2002 | Stegherr | |
| 6,381,948 B1 | 5/2002 | Klingels | |
| 6,382,915 B1 | 5/2002 | Aschermann et al. | |
| 6,384,494 B1 | 5/2002 | Avidano et al. | |
| 6,425,382 B1 * | 7/2002 | Marthaler et al. | 123/568.17 |
| 6,430,917 B1 * | 8/2002 | Platts | 60/39.43 |
| 6,454,535 B1 | 9/2002 | Goshorn et al. | |
| 6,471,474 B1 | 10/2002 | Mielke et al. | |
| RE37,900 E | 11/2002 | Partington | |
| 6,513,334 B2 | 2/2003 | Varney | |
| 6,619,030 B1 | 9/2003 | Seda et al. | |
| 6,851,264 B2 | 2/2005 | Kirtley et al. | |
| 6,883,303 B1 | 4/2005 | Seda | |
| 6,910,854 B2 | 6/2005 | Joslin | |
| 6,966,174 B2 * | 11/2005 | Paul | 60/226.1 |
| 7,021,042 B2 | 4/2006 | Law | |
| 7,214,157 B2 | 5/2007 | Flamang et al. | |
| 2002/0190139 A1 | 12/2002 | Morrison | |
| 2003/0031556 A1 | 2/2003 | Mulcaire et al. | |
| 2003/0131602 A1 | 7/2003 | Ingistov | |
| 2003/0131607 A1 | 7/2003 | Daggett | |
| 2003/0192304 A1 | 10/2003 | Paul | |
| 2004/0025490 A1 | 2/2004 | Paul | |
| 2004/0070211 A1 | 4/2004 | Franchet et al. | |
| 2004/0189108 A1 | 9/2004 | Dooley | |
| 2004/0219024 A1 | 11/2004 | Soupizon et al. | |
| 2005/0008476 A1 | 1/2005 | Eleftheriou | |
| 2005/0127905 A1 | 6/2005 | Proctor et al. | |
| 2005/0138914 A1 * | 6/2005 | Paul | 60/226.1 |

FOREIGN PATENT DOCUMENTS

| | | |
|---|---|---|
| DE | 765809 | 11/1954 |
| DE | 1173292 | 7/1964 |
| DE | 1301634 | 8/1969 |
| DE | 2361310 | 6/1975 |
| DE | 2451059 | 4/1976 |
| DE | 3333437 | 4/1985 |
| DE | 3942042 | 6/1991 |
| DE | 19519322 | 11/1996 |
| DE | 19646601 | 4/1997 |
| DE | 19644543 | 4/1998 |
| EP | 0475771 | 3/1992 |
| EP | 0661413 | 7/1995 |
| EP | 1319896 | 6/2003 |
| FR | 1033849 | 7/1953 |
| FR | 1367893 | 7/1964 |
| FR | 2274788 | 1/1976 |
| FR | 2566835 | 1/1986 |
| FR | 2599086 | 11/1987 |
| GB | 716263 | 9/1954 |
| GB | 766728 | 1/1957 |
| GB | 785721 | 11/1957 |
| GB | 905136 | 9/1962 |
| GB | 907323 | 10/1962 |
| GB | 958842 | 5/1964 |
| GB | 1026102 | 4/1966 |
| GB | 1046272 | 10/1966 |
| GB | 1287223 | 8/1972 |
| GB | 1338499 | 11/1973 |
| GB | 1351000 | 4/1974 |
| GB | 1357016 | 6/1974 |
| GB | 1466613 | 3/1977 |
| GB | 1503394 | 3/1978 |
| GB | 2016597 | 9/1979 |
| GB | 2026102 | 1/1980 |
| GB | 2095755 | 10/1982 |
| GB | 2191606 | 12/1987 |
| GB | 2229230 | 9/1990 |
| GB | 2265221 | 9/1993 |
| GB | 2401655 | 11/2004 |
| GB | 2410530 | 8/2005 |
| JP | 10184305 | 7/1998 |
| WO | 9902864 | 1/1999 |
| WO | 0127534 | 4/2001 |
| WO | 02081883 | 10/2002 |
| WO | 2004011788 | 2/2004 |
| WO | 2004022948 | 3/2004 |
| WO | 2004092567 | 10/2004 |

| | | | | | | |
|---|---|---|---|---|---|---|
| WO | 2006/059968 | 6/2006 | | WO | 2006/060000 | 6/2006 |
| WO | 2006/059969 | 6/2006 | | WO | 2006/060001 | 6/2006 |
| WO | 2006/059972 | 6/2006 | | WO | 2006/060002 | 6/2006 |
| WO | 2006/059973 | 6/2006 | | WO | 2006/060004 | 6/2006 |
| WO | 2006/059974 | 6/2006 | | WO | 2006/060005 | 6/2006 |
| WO | 2006/059975 | 6/2006 | | WO | 2006/060006 | 6/2006 |
| WO | 2006/059976 | 6/2006 | | WO | 2006/060009 | 6/2006 |
| WO | 2006/059977 | 6/2006 | | WO | 2006/060010 | 6/2006 |
| WO | 2006/059978 | 6/2006 | | WO | 2006/060011 | 6/2006 |
| WO | 2006/059979 | 6/2006 | | WO | 2006/060012 | 6/2006 |
| WO | 2006/059980 | 6/2006 | | WO | 2006/060013 | 6/2006 |
| WO | 2006/059981 | 6/2006 | | WO | 2006/060014 | 6/2006 |
| WO | 2006/059982 | 6/2006 | | WO | 2006/062497 | 6/2006 |
| WO | 2006/059985 | 6/2006 | | WO | 2006059980 | 6/2006 |
| WO | 2006/059986 | 6/2006 | | WO | 2006059990 | 6/2006 |
| WO | 2006/059987 | 6/2006 | | WO | 2006060003 | 6/2006 |
| WO | 2006/059988 | 6/2006 | | WO | 2006/059971 | 8/2006 |
| WO | 2006/059989 | 6/2006 | | WO | 2006/059970 | 10/2006 |
| WO | 2006/059990 | 6/2006 | | WO | 2006/110122 | 10/2006 |
| WO | 2006/059991 | 6/2006 | | WO | 2006/059997 | 11/2006 |
| WO | 2006/059992 | 6/2006 | | WO | 2006/110124 | 11/2006 |
| WO | 2006/059993 | 6/2006 | | WO | 2006/110123 | 12/2006 |
| WO | 2006/059994 | 6/2006 | | WO | 2006/112807 | 12/2006 |
| WO | 2006/059995 | 6/2006 | | WO | 2006/110125 | 2/2007 |
| WO | 2006/059996 | 6/2006 | | WO | 2006/060003 | 3/2007 |
| WO | 2006/059999 | 6/2006 | | | | |

\* cited by examiner

EJECTOR COOLING OF OUTER CASE FOR TIP TURBINE ENGINE

This invention was conceived in performance of U.S. Air Force contract F33657-03-C-2044. The government may have rights in this invention.

BACKGROUND OF THE INVENTION

The present invention relates to a turbine engine, and more particularly to a means and method for reducing heat transfer from a tip turbine engine to an engine bay or nacelle.

An aircraft gas turbine engine of the conventional turbofan type generally includes a forward bypass fan, a low pressure compressor, a middle core engine, and an aft low pressure turbine, all located along a common longitudinal axis. A high pressure compressor and a high pressure turbine of the core engine are interconnected by a high spool shaft. The high pressure compressor is rotatably driven to compress air entering the core engine to a relatively high pressure. This high pressure air is then mixed with fuel in a combustor, where it is ignited to form a high energy gas stream. The gas stream flows axially aft to rotatably drive the high pressure turbine, which rotatably drives the high pressure compressor via the high spool shaft. The gas stream leaving the high pressure turbine is expanded through the low pressure turbine, which rotatably drives the bypass fan and low pressure compressor via a low spool shaft.

Although highly efficient, conventional turbofan engines operate in an axial flow relationship. The axial flow relationship results in a relatively complicated elongated engine structure of considerable length relative to the engine diameter. This elongated shape may complicate or prevent packaging of the engine into particular applications.

A recent development in gas turbine engines is the tip turbine engine. Tip turbine engines include hollow fan blades that receive core airflow therethrough such that the interiors of the hollow fan blades operate as a centrifugal compressor. Compressed core airflow from the hollow fan blades is mixed with fuel in an annular combustor, where it is ignited to form a high energy gas stream which drives the turbine that is integrated onto the tips of the hollow bypass fan blades for rotation therewith as generally disclosed in U.S. Patent Application Publication Nos.: 2003192303; 20030192304; and 20040025490. The tip turbine engine provides a thrust-to-weight ratio equivalent to or greater than conventional turbofan engines of the same class, but within a package of significantly shorter length.

In a conventional turbine engine, the nacelle surrounds hot engine cases to protect any adjacent aircraft structure. The bypass airflow separates the hot engine cases from the nacelle, thereby keeping the nacelle cool. However, in the tip turbine engine, the combustor is radially outward of the bypass airflow, as is the high-energy gas stream. Thus, the engine case of the tip turbine engine transfers substantial amounts of heat to the nacelle.

SUMMARY OF THE INVENTION

A tip turbine engine according to the present invention provides a cooling air path extending from a forward end of the nacelle to a point rearward of the combustor and exhaust mixer. The cooling air path is a cold air ejector that includes an annular inlet at the forward end of the nacelle.

The cold air ejector draws air over the outer engine cases to provide a boundary between the nacelle and the hot outer cases of the engine. The layer of air being pulled past the engine cases ejects the heat, thereby preventing the heat from escaping into the nacelle or engine bay.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
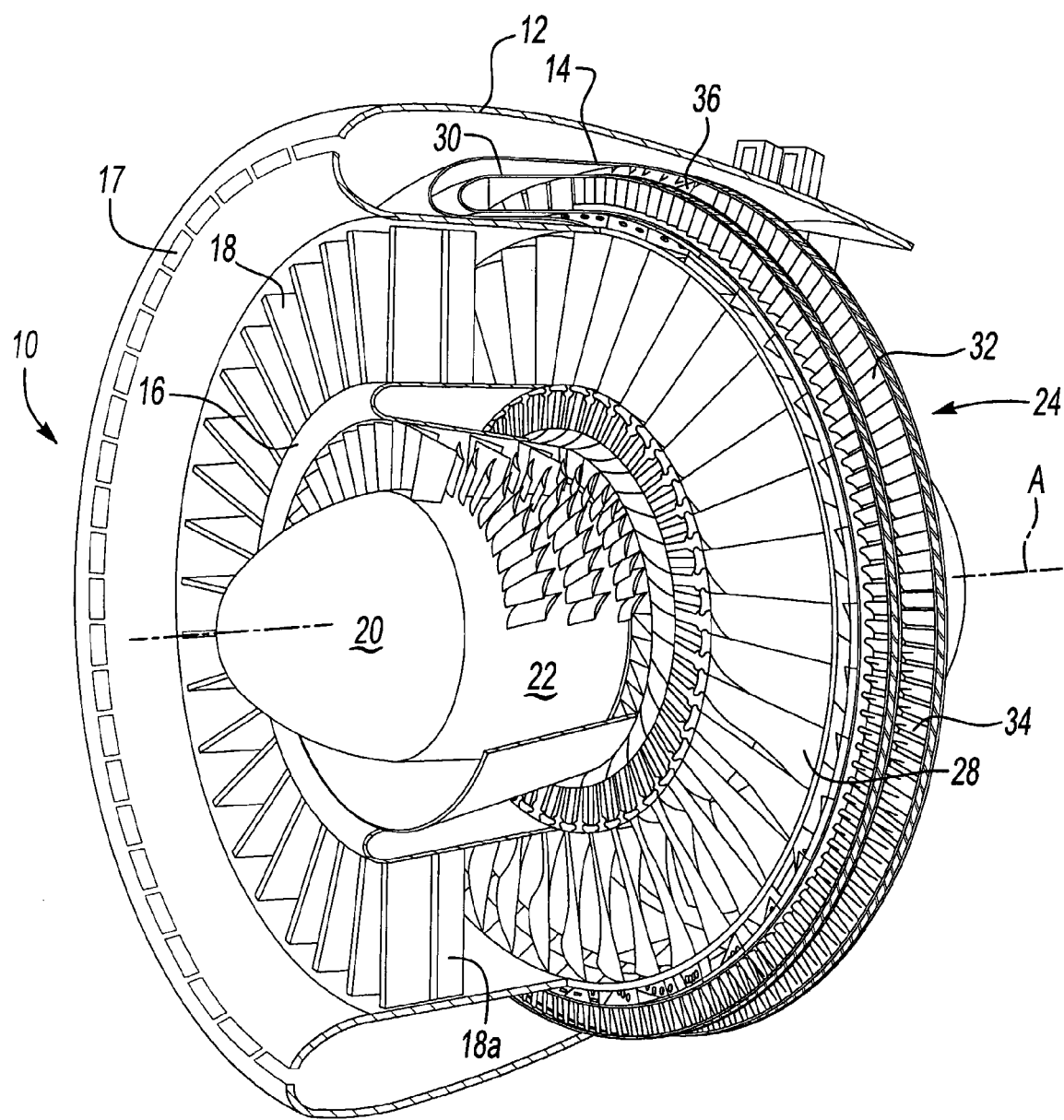
FIG. 1 is a partial sectional perspective view of a tip turbine engine according to the present invention.

FIG. 1 illustrates a general perspective partial sectional view of a tip turbine engine (TTE) type gas turbine engine 10 surrounded by an outer nacelle 12. The engine 10 includes a rotationally fixed static outer support structure 14 and a rotationally fixed static inner support structure 16. The nacelle 12 includes an annular ejector opening 17 at a forward end thereof. A plurality of fan inlet guide vanes 18 are mounted between the static outer support structure 14 and the static inner support structure 16. Each inlet guide vane preferably includes a variable trailing edge 18A.

A nosecone 20 is preferably located along the engine centerline or axis A to improve airflow into an axial compressor 22, which is mounted about the engine centerline A behind the nosecone 20.

A fan-turbine rotor assembly 24 is mounted for rotation about the engine centerline A aft of the axial compressor 22. The fan-turbine rotor assembly 24 includes a plurality of hollow fan blades 28 to provide internal, centrifugal compression of the compressed airflow from the axial compressor 22 for distribution to an annular combustor 30 located within the rotationally fixed static outer support structure 14.

A turbine 32 includes a plurality of tip turbine blades 34 (two stages shown) which rotatably drive the hollow fan blades 28 relative to a plurality of tip turbine stators 36 which extend radially inwardly from the rotationally fixed static outer support structure 14. The annular combustor 30 is disposed axially forward of the turbine 32 and communicates with the turbine 32.

Figure 2:
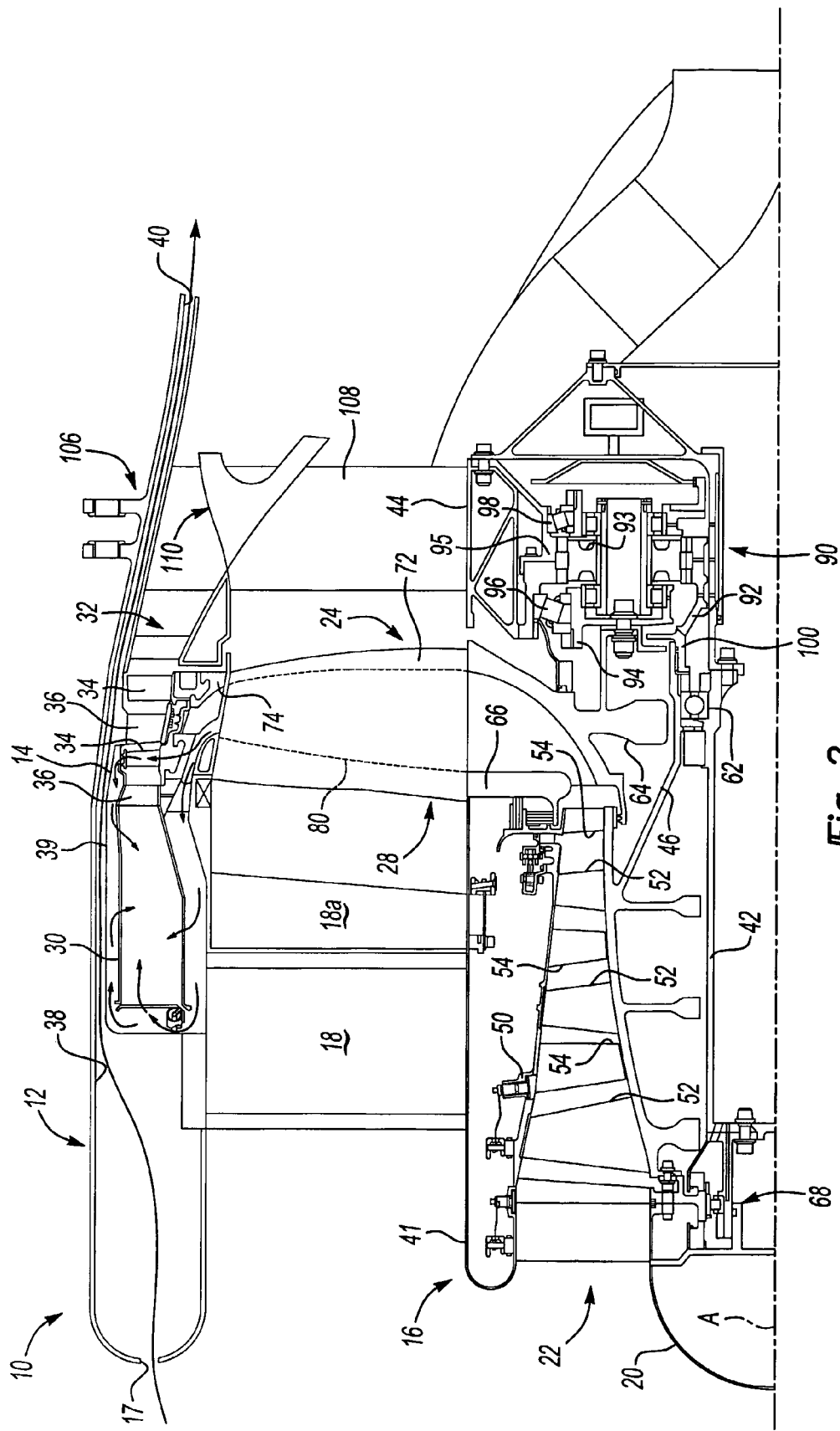
FIG. 2 is a longitudinal sectional view of the tip turbine engine of FIG. 1 taken along an engine centerline.

Referring to FIG. 2, the ejector opening 17 leads to a cold air ejector 38, which is an annular cooling air flowpath defined between an engine case 39 and the nacelle 12. The ejector 38 is created by the high velocity gas flow through the turbine 32, which draws the airflow through the adjacent ejector 38. The cold air ejector 38 is radially outward of the engine case 39, which is radially outward of the combustor 30, tip turbine blades 34, tip turbine stators 36 and the exhaust mixer 110. The cold air ejector 38 extends from the ejector opening 17 at the forward end of the nacelle 12 to an outlet 40 that is substantially axially aligned with a rearward edge of the exhaust mixer 110.

The rotationally fixed static inner support structure 16 includes a splitter 41, a static inner support housing 42 and a static outer support housing 44 located coaxial with said engine centerline A. The axial compressor 22 includes the axial compressor rotor 46, from which a plurality of compressor blades 52 extend radially outwardly, and a fixed compressor case 50. A plurality of compressor vanes 54 extend radially inwardly from the compressor case 50 between stages of the compressor blades 52. The compressor blades 52 and compressor vanes 54 are arranged circumferentially about the axial compressor rotor 46 in stages (three stages of compressor blades 52 and three stages of compressor vanes 54 are shown in this example). The axial compressor rotor 46 is mounted for rotation upon the static inner support housing 42 through a forward bearing assembly 68 and an aft bearing assembly 62.

The fan-turbine rotor assembly 24 includes a fan hub 64 that supports a plurality of the hollow fan blades 28. Each fan blade 28 includes an inducer section 66, a hollow fan blade section 72 and a diffuser section 74. The inducer section 66 receives airflow from the axial compressor 22 generally parallel to the engine centerline A and turns the airflow from an axial airflow direction toward a radial airflow direction. The airflow is radially communicated through a core airflow passage 80, which acts as a centrifugal compressor chamber within the fan blade section 72. From the core airflow passage 80, the airflow is diffused and turned once again toward an axial airflow direction toward the annular combustor 30. Preferably, the airflow is diffused axially forward in the engine 10, however, the airflow may alternatively be communicated in another direction.

The tip turbine engine 10 may optionally include a gearbox assembly 90 aft of the fan-turbine rotor assembly 24, such that the fan-turbine rotor assembly 24 rotatably drives the axial compressor 22 via the gearbox assembly 90. In the embodiment shown, the gearbox assembly 90 provides a speed increase at a 3.34-to-one ratio. The gearbox assembly 90 may be an epicyclic gearbox, such as a planetary gearbox as shown, that is mounted for rotation between the static inner support housing 42 and the static outer support housing 44. The gearbox assembly 90 includes a sun gear 92, which drives the axial compressor 22, and a planet carrier 94, which is driven by the fan-turbine rotor assembly 24. A plurality of first planet gears 93 each engage the sun gear 92 and a rotationally fixed ring gear 95. The first planet gears 93 are mounted to the planet carrier 94. The gearbox assembly 90 is mounted for rotation between the sun gear 92 and the static outer support housing 44 through a gearbox forward bearing 96 and a gearbox rear bearing 98. The gearbox assembly 90 may alternatively, or additionally, reverse the direction of rotation and/or may provide a decrease in rotation speed. It should be noted that the gearbox assembly 90 could utilize other types of gear arrangements or other gear ratios and that the gearbox assembly 90 could be located at locations other than aft of the axial compressor 22. For example, the gearbox assembly 90 could be located at the front end of the axial compressor 22.

In operation, core airflow enters the axial compressor 22, where it is compressed by the compressor blades 52. The compressed air from the axial compressor 22 enters the inducer section 66 in a direction generally parallel to the engine centerline A, and is then turned by the inducer section 66 radially outwardly through the core airflow passage 80 of the hollow fan blades 28. The airflow is further compressed centrifugally in the hollow fan blades 28 by rotation of the hollow fan blades 28. From the core airflow passage 80, the airflow is turned and diffused axially forward in the engine 10 into the annular combustor 30. The compressed core airflow from the hollow fan blades 28 is mixed with fuel in the annular combustor 30 and ignited to form a high-energy gas stream.

The high-energy gas stream is expanded over the plurality of tip turbine blades 34 mounted about the outer periphery of the fan-turbine rotor assembly 24 to drive the fan-turbine rotor assembly 24, which in turn rotatably drives the axial compressor 22 via the gearbox assembly 90.

The cold air ejector 38 draws air over the engine case 39 from the ejector opening 17 to the outlet 40 to provide a boundary between the nacelle 12 and the hot engine case 39. The layer of air being pulled past the engine case 39 ejects the heat, thereby preventing the heat from escaping into the nacelle 12 or engine bay.

The fan-turbine rotor assembly 24 discharges fan bypass air axially aft to merge with the core airflow from the turbine 32 in an exhaust case 106. A plurality of exit guide vanes 108 are located between the static outer support housing 44 and the rotationally fixed static outer support structure 14 to guide the combined airflow out of the engine 10 and provide forward thrust. An exhaust mixer 110 mixes the airflow from the tip turbine blades 34 with the bypass airflow through the fan blades 28.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The invention claimed is:

1. A turbine engine comprising: a fan rotatable about an axis, the fan including a plurality of fan blades; a turbine operatively coupled to outer ends of the fan blades, the turbine rotatably driving the fan; a combustor generating a high-energy gas stream to rotatably drive the turbine; a cooling air path radially outward of the high-energy gas stream and at least one of the combustor and the turbine, the cooling air path having an inlet fore of the combustor and an outlet aft of the combustor; and a nacelle radially outward of the combustor and the cooling air path, the inlet formed in the nacelle.

2. The turbine engine of claim 1 wherein at least one of the fan blades includes a compressor chamber extending radially therein and leading toward the combustor.

3. The turbine engine of claim 2 further including an engine case radially outward of the combustor and the turbine, wherein at least some compressed air from the compressor chamber flows between the engine case and the combustor and then into the combustor, the cooling airflow air path radially outward of the compressed air flowing between the engine case and the combustor.

4. The turbine engine of claim 1 wherein rotation of the fan creates a fan exhaust radially inward of the high-energy gas stream.

5. The turbine engine of claim 1 further including an engine case radially outward of the combustor and the turbine, the cooling air path disposed radially outward of the engine case, the cooling air path inlet fore of the engine case.

6. The turbine engine of claim 1 wherein the cooling air path is a cold air ejector.

7. The turbine engine of claim 1 further including an exhaust mixer aft of the turbine, wherein the outlet of the cooling air path is aft of at least a portion of the exhaust mixer.

8. The turbine engine of claim 1 wherein the entire cooling air path between the inlet and the outlet is radially outward of the combustor and the turbine.

9. The turbine engine of claim 1 wherein a portion of the cooling path is radially outward of the combustor in a plane perpendicular to the axis and passing through the combustor.

10. The turbine engine of claim 1 wherein a portion of the cooling path is radially outward of the turbine in a plane perpendicular to the axis and passing through the turbine.

11. A turbine engine comprising: a fan rotatable about an axis, the fan including a plurality of fan blades, rotation of the fan creating a fan exhaust; a combustor generating a high-energy gas stream radially outward of the fan exhaust; an engine case radially outward of the fan and the combustor; a nacelle radially outward of the engine case; and a cooling air path radially outward of the engine case and radially inward of the nacelle, the cooling air path having an inlet formed in the nacelle.

12. The turbine engine of claim 11 wherein the cooling air path has an inlet fore of the combustor and the engine case and an outlet aft of the combustor.

13. The turbine engine of claim 11 wherein at least one of the fan blades includes a compressor chamber extending radially therein and leading toward the combustor.

14. The turbine engine of claim 11 further including a turbine operatively connected to the fan and disposed aft of the combustor, the high-energy gas stream rotatably driving the turbine and the fan, the outlet of the cooling air path disposed aft of the turbine.

15. The turbine engine of claim 14 further including an exhaust mixer aft of the turbine, wherein the outlet of the cooling air path is aft of at least a portion of the exhaust mixer.

16. The turbine engine of claim 14 wherein the engine case is radially outward of the turbine and the fan.

17. A method of operating a turbine engine including the steps of:
   a) centrifugally compressing core airflow in interiors of a plurality of fan blades of a fan;
   b) sending the compressed core airflow to a combustor, the core airflow following a core airflow path including the interiors of the plurality of fan blades and extending radially outward of the combustors and then to the combustors;
   c) generating a high-energy gas stream in the combustor radially outward of the fan; and
   d) guiding cooling air radially outward of the high-energy gas stream and radially outward of the entire core airflow path to reduce heat transfer radially outward of the high-energy gas stream.

18. The method of claim 17 further including the step of rotatably driving the fan with a turbine proximate an outer periphery of the fan, the turbine rotatably driven by the high-energy gas stream.

19. The method of claim 17 wherein said step b) further includes the step of flowing the cooling air into an inlet axially fore of the high-energy gas stream.

* * * * *